United States Patent [19]

Fujimoto

[11] 4,033,575

[45] July 5, 1977

[54] AUTOMATIC SHEET FEED AND DELIVERY APPARATUS

[75] Inventor: Sakae Fujimoto, Chofu, Japan

[73] Assignee: Ricoh Co., Ltd., Tokyo, Japan

[22] Filed: Oct. 12, 1976

[21] Appl. No.: 731,423

[30] Foreign Application Priority Data

Oct. 9, 1975  Japan .............................. 50-122309

[52] U.S. Cl. .................................... 271/3; 271/82; 271/265; 271/277
[51] Int. Cl.² ........................................... B65H 5/12
[58] Field of Search ............ 271/3, 7, 82, 204, 227, 271/244, 277, 265; 346/125, 132, 138

[56] References Cited

UNITED STATES PATENTS

| | | |
|---|---|---|
| 3,843,114 | 10/1974 | Kojima .......................... 271/277 X |
| 3,865,362 | 2/1975 | Luffy ..................................... 271/82 |
| 3,918,707 | 11/1975 | Villemer ............................ 271/277 |

Primary Examiner—Richard A. Schacher
Attorney, Agent, or Firm—Cooper, Dunham, Clark, Griffin & Moran

[57] ABSTRACT

An apparatus is disclosed for automatically wrapping an original to be transmitted, or a record sheet for receiving a signal, around a drum of a facsimile system or the like and for automatically delivering the sheet from the drum subsequent to the completion of processing of the sheet such as a scanning of the original for transmission or recording a received signal on the sheet.

15 Claims, 19 Drawing Figures

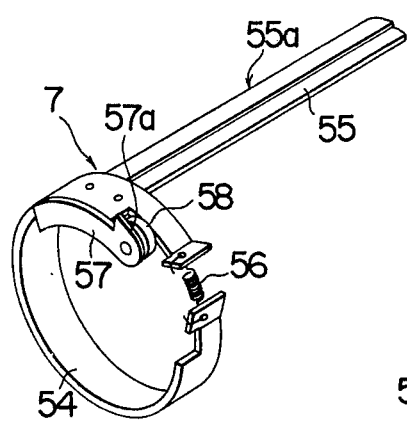
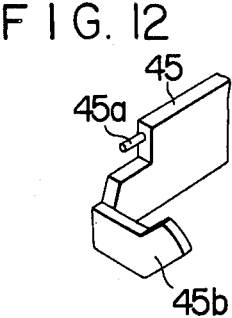
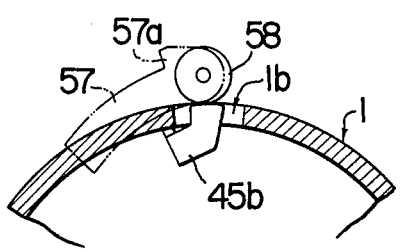
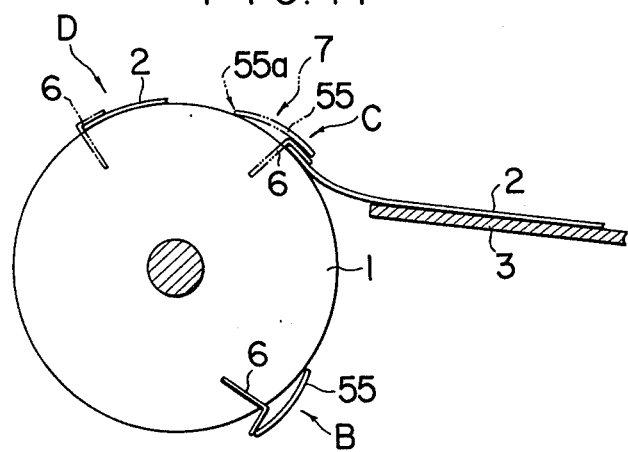

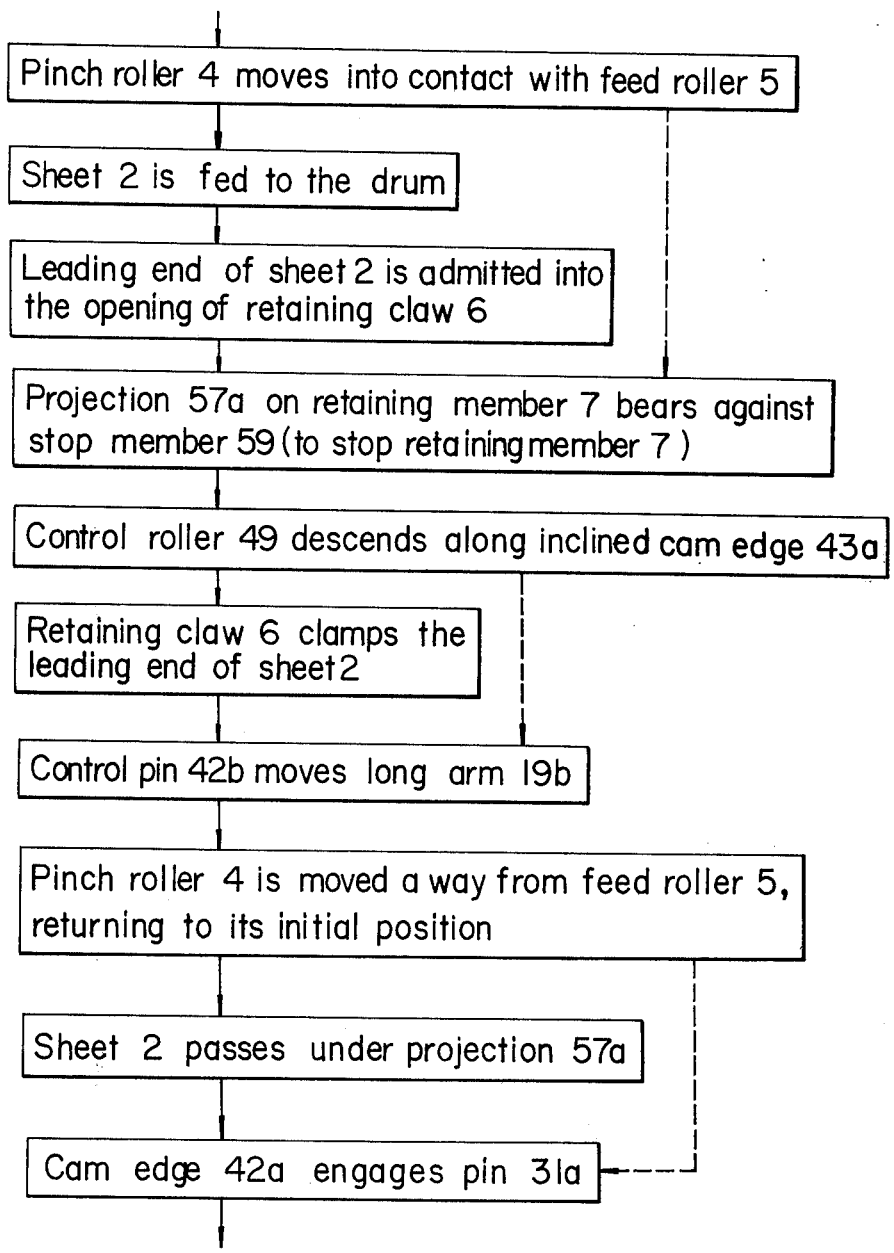

AUTOMATIC SHEET FEED AND DELIVERY APPARATUS

BACKGROUND OF THE INVENTION

The invention relates to an automatic apparatus for feeding and wrapping a sheet around a rotating drum, firmly clamping the leading and trailing ends of the sheet onto the drum and subsequently delivering the sheet from the drum.

An apparatus for wrapping an original or a record sheet around a rotating drum, clamping the leading and trailing ends of the sheet onto the drum and finally delivering the sheet from the drum is already known in equipment such as a facsimile system, for example. However, the conventional apparatus suffers from inconveniences including unreliability in operation, particularly when wrapping the sheet automatically around the drum which is being driven for rotation at a relatively high speed.

SUMMARY OF THE INVENTION

It is an object of the invention to provide an automatic sheet feed and delivery apparatus which feeds a sheet to a drum which is rotated at a relatively high speed, and clamps the leading and trailing ends of the sheet onto the drum in a smooth and reliable manner.

BRIEF DESCRIPTION OF THE DRAWINGS

FIG. 11 is a perspective view of a retaining member associated with the trailing end of the sheet;

FIG. 12 is a fragmentary perspective view of a support member, illustrating its end portion;

FIG. 13 is a fragmentary front view, partly in section, of the drum, with the roller projecting externally of the drum surface;

FIG. 14 is a schematic front view illustrating the sheet clamping action;

FIG. 17a – c are a flow chart illustrating the operation of the apparatus according to the invention.

DETAILED DESCRIPTION OF PREFERRED EMBODIMENT

Figure 1:
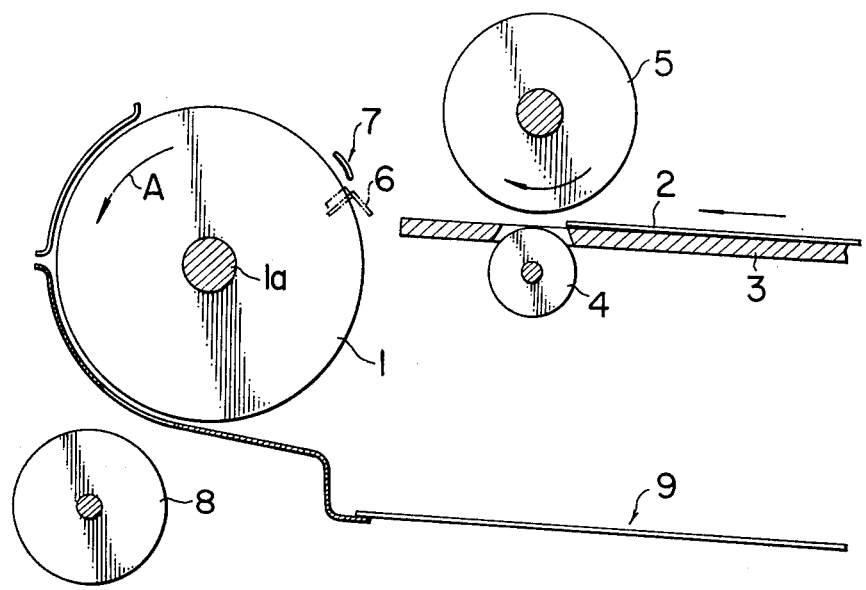
FIG. 1 is a schematic front view of one embodiment of the apparatus according to the invention.

With reference to FIG. 1, the general arrangement of the apparatus of the invention will be described first. In this Figure, there is shown a drum 1 as may be used in a facsimile system, for example, and around which may be disposed or wrapped a sheet 2 such as an original to be transmitted or a record paper for recording a received signal. The sheet 2 is initially placed on a receptacle 3 and then fed through the nip between a pinch roller 4 and a normally rotating sheet feed roller 5 in a direction toward the drum 1. A retaining claw 6 associated with the leading end of the sheet is initially maintained in an open condition and clamps the leading end of the sheet as it engages it. After the leading end of the sheet is clamped by the retaining claw 6, a retaining member 7 associated with the trailing end of the sheet remains stationary during a subsequent one revolution of the drum 1 on shaft 1a in a direction indicated by an arrow A until the retaining claw 6 moves past under the retaining member 7, whereupon the latter operates to clamp the trailing end of the sheet and rotates together with the drum 1. At this point, a scanning of an original to be transmitted, for example, is commenced. Simultaneously with the termination of the scanning operation, the retaining claw 6 and the retaining member 7 associated with the leading and trailing end of the sheet are released, and a delivery roller 8 is brought into abutting relationship with the drum 1 to deliver the sheet, which is then received onto a delivery table 9. The specific construction which enables the described operations to be carried out with proper timing and in a reliable manner will be described below.

Figure 3:
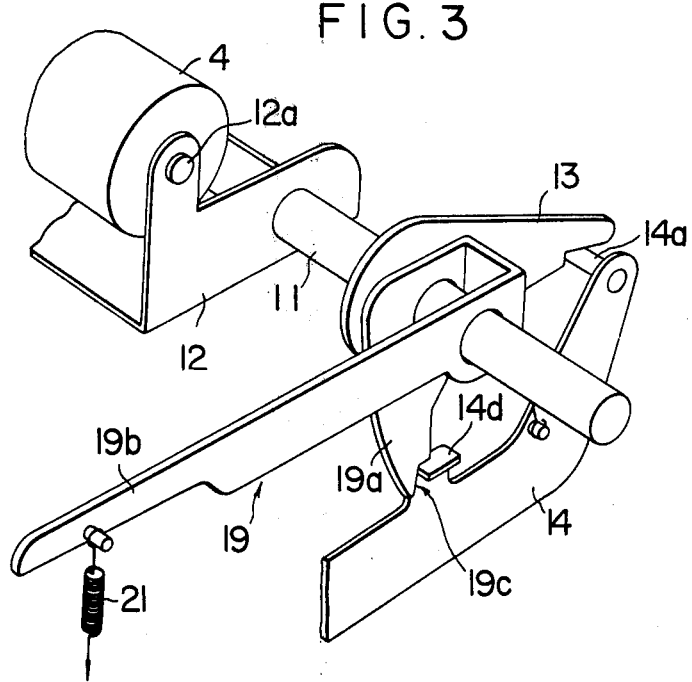
FIG. 3 is a perspective view of an operating mechanism for the feed roller shown in FIGS. 1 and 2.
Figure 2:
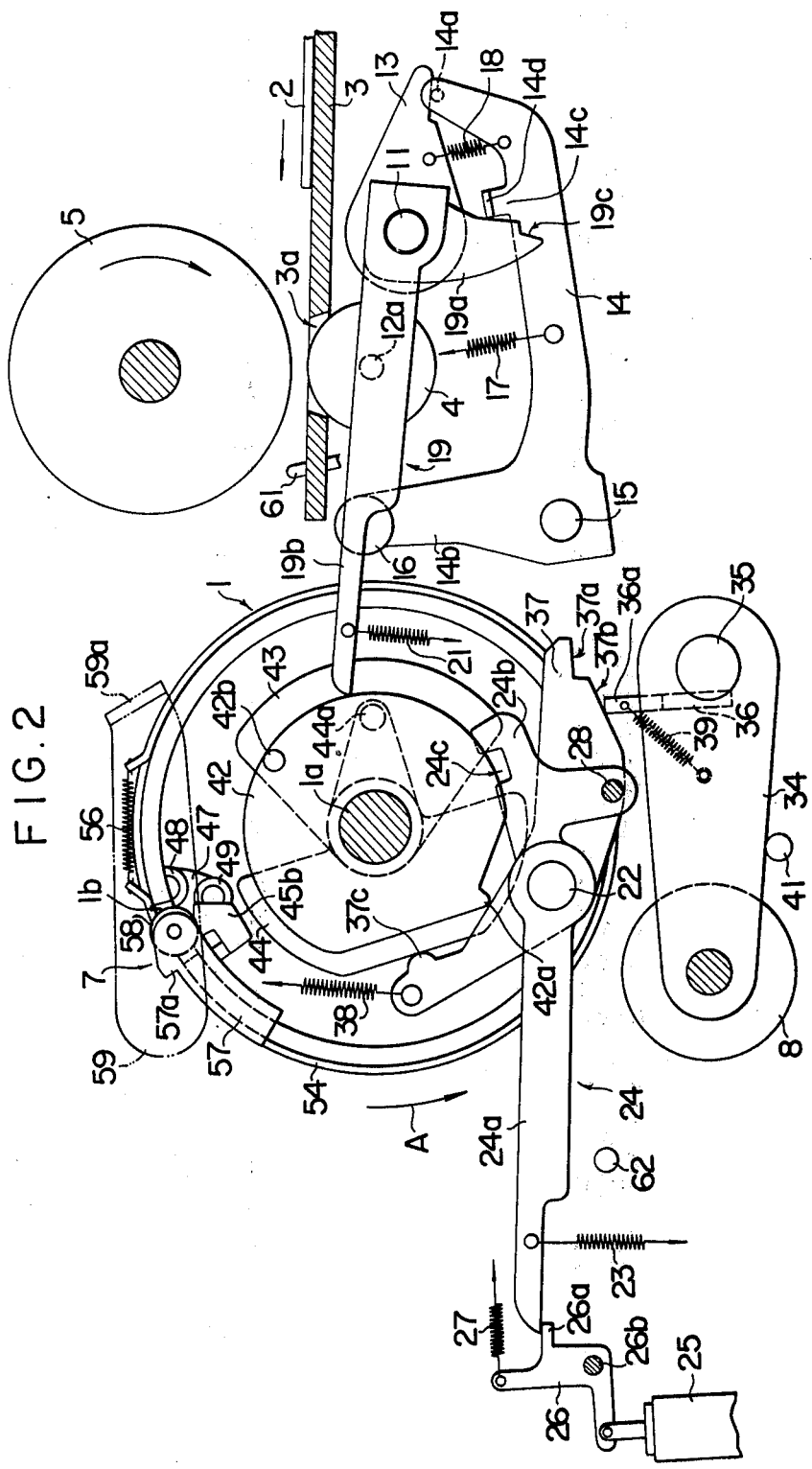
FIG. 2 is a front view of the apparatus schematically shown in FIG. 1 during its initial phase.

Referring to FIG. 2, the paper feed roller 5 is located above the receptacle 3 and is normally rotating in the direction indicated by an arrow. Located below the receptacle 3 is the pinch roller 4, which is partly disposed in an opening 3a formed in the receptacle 3. The pinch roller 4 is movable toward or away from the feed roller 5, and is rotatably mounted on a stub shaft 12a attached to the free end of a support lever 12 which is fixedly mounted on a shaft 11 extending in parallel relationship with the drum 1, as shown in FIG. 3. An arm 13 is fixedly mounted on the shaft 11, which is rotatably mounted on a pair of sideplates of the apparatus, not shown. At its free end, the lower edge of the arm 13 is engaged by a pin 14a fixedly mounted on the end of one arm of a rockable lever 14.

Referring to FIG. 2, the rockable lever 14 is pivotally mounted on a stationary pivot 15, and has an upwardly extending arm 14b which carries a roller 16 on its end. The rockable lever 14 is biased by a tension spring 17 to rotate counterclockwise about the pivot 15, and another tension spring 8 is connected with and extends between the other arm of the rockable lever 14 and the arm 13, the resilience of the spring 18 being effective to bring the lower edge of the free end of the arm 13 into abutting relationship with the pin 14a. Adjacent to the end of this arm, the rockable lever 14 has an upstanding piece 14c which extends upwardly from the upper edge thereof and which is formed with a folded piece 14d for engagement with a short arm 19a integral with an operating lever 19. In its end, the arm 19a is formed with a notch 19c, and the folded piece 14d is adapted to engage the notch 19c after sliding along the lateral edge of the arm 19a as will be further described later.

Referring to FIG. 3, the operating lever 19 is of integral construction having a long arm 19b extending toward one end of the drum 1 (see FIG. 2) and a channel-shaped, integral structure, a part of which is formed by the short arm 19a. At the end including the integral channel-shaped construction, the operating lever 19 is rotatably mounted on the shaft 11, and adjacent to its other end, the lever 19 is engaged by tension spring 21 extending between the free end of the long arm 19b and a stationary point, whereby it is biased to rotate e counterclockwise about the shaft 11.

Figure 4:
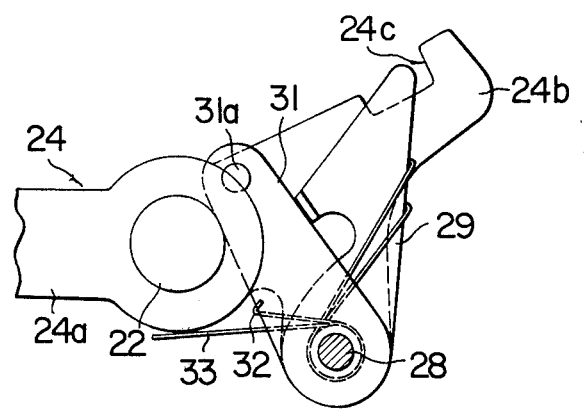
FIGS. 4 and 5 are front views illustrating a returning motion of a control lever.

In FIG. 2, a control lever 24 is pivotally mounted on a shaft 22 supported by one of the pair of sideplates mentioned above, and has one arm 24a which is engaged by a tension spring 23 to bias it to rotate counterclockwise, the free end of the arm 24a being engaged by a detent piece 26a extending from a detent lever 26 which is connected with the armature of an electromagnet 25. The control lever 24 also has another integral arm 24b in which a detent hook 24c is formed and which also has a downwardly depending arm which fixedly carries a shaft 28 thereon. As shown in FIG. 4, a pair of levers 29, 31 are pivotally mounted on the shaft 28 and are coupled together by spring 32, and are also biased by another spring 33 to rotate counterclockwise about the shaft 28.

In FIG. 2, a delivery roller support lever 34 disposed below the drum 1 is pivotally mounted on a shaft 35 which is carried by the above-mentioned pair of sideplates, and rotatably carries the delivery roller 8 on its free end. As indicated more clearly in FIG. 6, a control rod 36 having a pair of tabs 36a, 36b is fixedly mounted on the shaft 35. In FIG. 2, a lever 37 is also pivotally mounted on the shaft 22 and has an arm having a detent notch 37a formed in the end thereof and an inclined lateral edge 37b. Edge 37b is engaged by the tab 36a of the control rod 36 to prevent the lever 37 from rotating in the clockwise direction under the resilience of a spring 38 which extends between the end of another arm of the lever 37 and a stationary point, a projection 37c being formed adjacent to the end of this other arm. A tension spring 39 extends between the delivery roller support lever 34 and the control rod 36. A stop for the support lever 34 is shown at 41.

Figure 7:
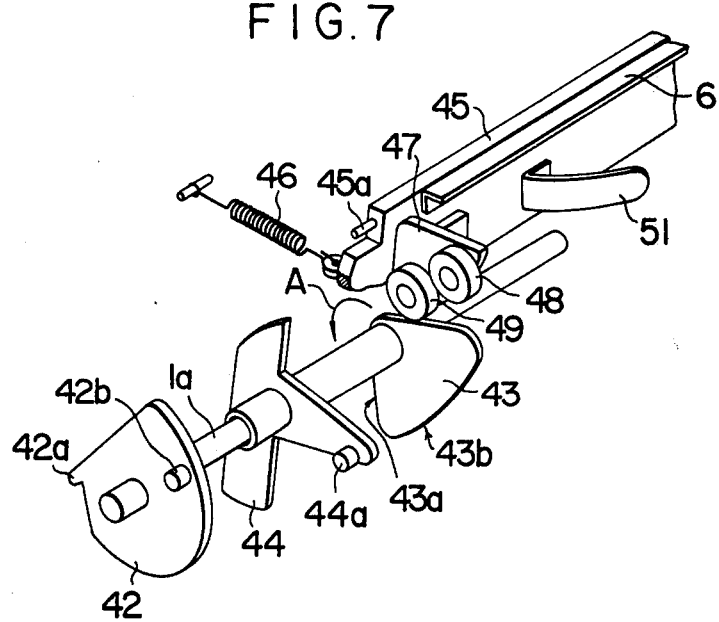
FIG. 7 is a perspective view of a control mechanism for the retaining claw associated with the leading end of the sheet.

With continued reference to FIG. 2, the drum 1 is mounted on a shaft 1a, which has a control plate 42 fixedly mounted thereon. In addition, a cam disc 43 and an integrally formed operating plate 44 are mounted on the shaft 1a for rotation therewith through frictional coupling. Referring to FIG. 7, the control plate 42 is formed with a cam projection 42a which cooperates with a pin 31a fixedly mounted on the end of the lever 31 (see FIG. 4), and also has control pin 42b fixedly mounted thereon for engagement with the projection 37c on the lever 37. The cam disc 43 and the operating plate 44 are interconnected integrally by a sleeve portion so as to be loosely fitted on the shaft 1a. The operating plate 44 has an arm on which a pin 44a is fixedly mounted for engagement with the detent hook 24c formed in the control lever 24 (see FIG.. 2). As will be seen FIG. 8, the operating plate 44 and the cam disc 43 are disposed internally within the drum 1, with the pin 44a on the operating plate 44 projecting from one end of the drum 1.

Figure 8:
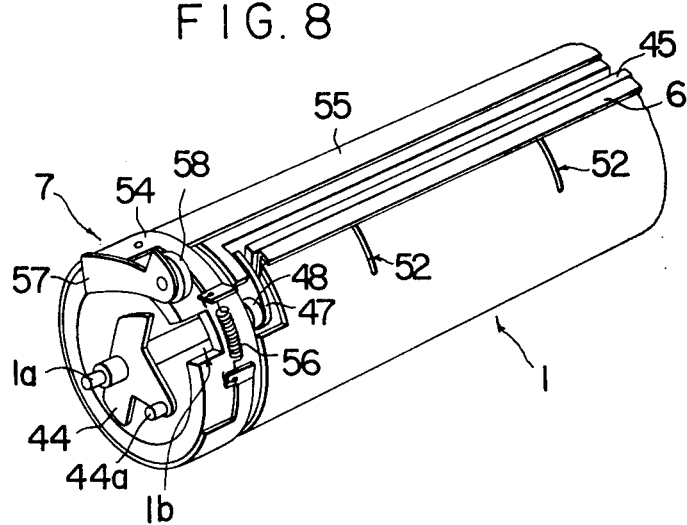
FIG. 8 is a perspective view of a drum used in the apparatus of the invention.

Referring to FIGS. 7 and 8, the retaining claw 6 associated with the leading end of the sheet is fixedly mounted on a support member 45 which is rockably mounted on the endwalls of the drum 1 by means of stub shafts 45a (only one being shown) formed at the opposite ends thereof. A tension spring 46 biases the support member 45 to rotate clockwise about the shafts 45a, and a bracket 47 is fixedly mounted on the support member 45 adjacent to one end thereof and carries an operating roller 48 serving as a projecting member. The bracket 47 also carries a control roller 49 which is adapted to engage the cam disc 43. A plurality of delivery claws 51 are fixedly mounted at suitable intervals on the support member 45 at a position below the retaining claw 6, and project externally of the drum surface through a plurality of slits 52 formed therein (see FIG. 8). Referring to FIG. 8, it will be seen that the operating roller 48 is normally received within the drum 1, but can be operated by the cam disc 43 to project externally of the drum 1, thereby opening the retaining claw 6 and projecting the delivery claws 51 externally of the drum surface as indicated by phantom line 51A in FIG. 10.

Referring again to FIG. 8, the retaining member 7 associated with the trailing end of the sheet is constructed in the following manner. Specifically, the opposite ends of the drum 1 are formed with peripherally extending steps in which a pair of bands 54 (only one being shown) are fitted, and as shown in FIG. 11, a retaining plate 55 which extends axially along the surface of the drum is secured to the bands. Each of the bands 54 has an opening formed in it, and the opposite ends of the opening are connected together by a spring 56, thus urging the retaining plate into abutment against the peripheral surface of the drum. A bracket 57 is fixedly connected with the band 54 and carries, on one end, a roller 58 and a projection 57a. It will be seen in FIg. 8, the roller 58 is normally received in a notch 1b formed in the end of the drum 1, as it is shown in FIG. 2. As shown in FIG. 12, the opposite ends of the support member 45 are formed with extensions 45b (only one being shown) which extend in a direction at right angles to the plane of the remainder thereof, and the roller 58 rides on the free end of the extension 45b as shown in FIG. 2.

Figure 15:
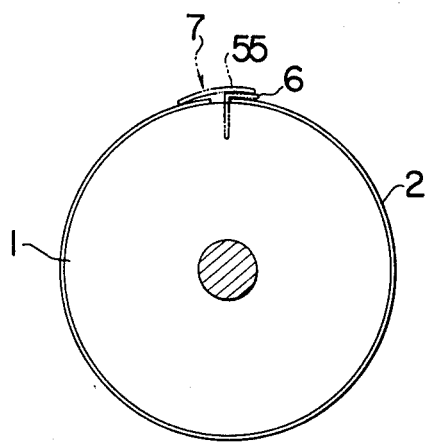
FIG. 15 is a front view showing the leading and trailing ends of the sheet as clamped.

In operation, FIG. 2 shows the condition of the apparatus before initiating a sheet feed operation when no sheet is wrapped around the drum. The feed roller 5 and the pinch roller 4 are spaced from each other and cannot provide a sheet feeding operation. The detent hook 24c in the control lever 24 is located out of the path of movement of the pin 44a on the operating plate 44. The delivery roller 8 is spaced from the peripheral surface of the drum 1 while the retaining claw 6 associated with the leading end of the sheet is closed as shown in solid line in FIG. 10. Since the roller 58 assumes a position received within the notch 1b in the drum 1, the retaining plate 55 (see FIG. 11) of the retaining member 7 associated with the trailing end of the sheet is disposed in overlying relationship with the retaining claw 6, as indicated in FIG. 15. A sheet 2 is then placed on and moved along the receptacle 3. A sheet detecting lever 61 is pivotally mounted on a pin, not shown, and has one end projecting above the forward end of the receptacle 3, and the opposite end of the lever 61 is engaged by an actuator of a microswitch, not shown.

Consequently, when the sheet 2 is loaded, the lever 61 is moved thereby, to close the microswitch, which is effective to energize the solenoid or coil of the electromagnet 25. Thereupon, the detent lever 26 is rocked counterclockwise about the stud 26b, releasing the control lever 24 from the detent piece 26a. As a result, the lever 24 rotates counterclockwise about the stud 22 under the resilience of the spring 23 until it bears against a stop 62. During such rotation of the lever, the detent hook 24c formed therein moves into the path of movement of the pin 44a (see FIG. 8) on the operating plate 44. Since the drum 1 is normally maintained in rotation, the pin 44a on the operating plate 44 which is frictionally coupled with the shaft 1a of the drum 1 is caught by the detent hook 24c as it comes to engage it subsequently whereby the operating plate 44 and the integral cam disc 43 are stopped regardless of the rotation of the drum 1.

Figure 9:
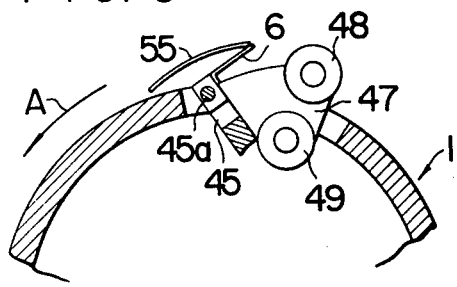
FIG. 9 is a front elevation, partly in section, showing the retaining claw associated with the leading end of the sheet in its open condition.
Figure 10:
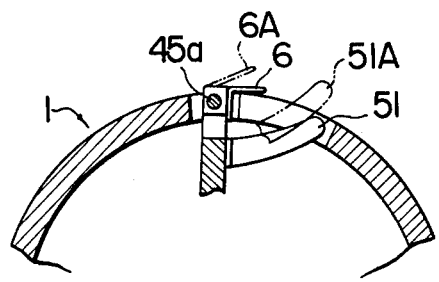
FIG. 10 is an elevational section illustrating the operation of the retaining claw associated with the leading end of the sheet and the delivery claw.

Referring to FIG. 7, as the drum 1 rotates relative to the cam disc 43 which remains at a standstill, or as the support member 45 rotates in a direction indicated by an arrow A together with the shaft 1a, the control roller 49 moves along a bevelled cam edge 43a to ride a cam edge 43b of a greater diameter, whereby the support member 45 is rotated counterclockwise about the pivots 45a against the resilience of the spring 46. As shown in FIG. 9, the resulting rotation of the support member 45 causes the operating roller 48 to move outwardly of the peripheral surface of the drum 1, thus opening the retaining claw 6 as shown at B in FIG. 14. The delivery claws 51 project through the slits 52 (shown in FIG. 8), as indicated in FIG. 10. The rotation of the support member 45 is also effective to drive the roller 58 externally and above the peripheral surface of the drum 1 with its extensions 45b as shown in FIG. 13. At this time, the retaining plate 55 of the retaining member 7 assumes a position shown in FIG. 9.

Referring to again to FIG. 2, the operating roller 48 (see FIG. 9) which projects externally of the drum surface bears against and moves the roller 16 on the rockable lever 14 in a direction such that the lever 14 rotates clockwise about the pivot 15 against the resilience of the spring 17, and the arm 13 which engages the pin 14a rotates clockwise under the resilience of the spring 18, with accompanying rotation of the shaft 11. At the same time, the support lever 12 shown in FIG. 3 rotates in the same direction, bringing the pinch roller 4 into abutting relationship against the feed roller 5 to feed the sheet 2 placed therebetween. As the rockable lever 14 rotates clockwise about the pivot 15, the notch 19c formed in the end of the short arm 19a of the operating lever 19 engages the folded piece 14d, as shown in FIG. 3, holding the rockable lever 14 in this position. When the above-mentioned engagement occurs, the operating lever 19 slightly rotates counterclockwise about the shaft 11, with the consequence that the forward end of the long arm 19b reaches a position located in the path of movement of the control pin 42b on the control plate 42. While not shown, a stop is provided adjacent to the forward end of the receptacle 3 for limiting the feed of the sheet 2. However, it is moved out of the passageway of the sheet as the support lever 12 (see FIG. 3) rotates in the clockwise direction. When the stop is moved out of the passageway, the sheet 2 is fed by the cooperating rollers 4, 5 onto the drum 1 and into the space between the drum surface and the retaining claw 6 as the latter moves close by the receptacle while assuming an open position as indicated in FIG. 9. To this end, both rollers 4, 5 are rotated at a speed which is slightly greater than the peripheral speed of the drum 1.

As the drum 1 further rotates, the projection 57a of the support plate 57 which assumes the position shown in FIG. 13 bears against a detent piece 59a of a stop member 59 which is disposed above the drum 1, thus causing the retaining member 7 (see FIG. 11) to stop thereat while the retaining claw 6 continues to rotate. In FIG. 7, when the control roller 49 has rolled over the surface of the cam disc 43 and the support member 45 rotates clockwise about the pivots 45a under the action of the spring 46, the operating roller 48 is moved to the position inward of the drum surface, whereby the retaining claw 6 is closed as shown at C in FIg. 14 to clamp the leading end of the sheet 2 while continuing its rotation together with the drum (see FIG. 14). As mentioned above, the retaining member 7 is stopped by the stop member 59 shortly before the retaining claw 6 is closed. For the convenience of description, assume now that the drum 1 is fixed in position. The roller 58 moves from its position engaging the extension 45b to the outside of the peripheral surface of the drum 1 as viewed in FIG. 13, and angularly moves thereon in the clockwise direction. After one revolution, the roller 58 falls into the notch 1b by an operation to be described later to stop the retaining member 7. The relative rotation of the retaining member 7 with respect to the drum 1 permits the retaining claw 6 which has the sheet 2 clamped therein to pass under the retaining plate 55, while the latter presses out the sheet 2 with its one side 55a (see FIG. 11) which continues to bear against the sheet, thereby wrapping the sheet 2 around the drum surface as shown at D in FIG. 14.

At this point, the extension 45b from the support member 45 has been retracted deep into the interior of the drum 1, as compared with the portion in FIG. 13. As a result, the roller 58 falls into the notch 1b in the drum 1, as shown in FIG. 8, and simultaneously the retaining plate 55 bears against the sheet 2 as shown in FIG. 15, thus clamping the trailing end of the sheet 2 which has its leading end clamped by the retaining claw 6. As indicated in FIG. 2, the projection 57a of the support plate 57 is disengaged from the detent piece 59a of the stop member 59 at the same time as the roller 58 has fallen into the notch 1b, whereby the retaining member 7 rotates together with the drum. In the meantime, the control pin 42b on the control plate 42 (see FIG. 7), which rotates integrally with the drum 1, engages the free end of the long arm 19b of the operating lever 19 which has moved into the path of movement thereof, thereby causing the lever 19 to rotate clockwise about the shaft 11 against the resilience of the spring 21. Consequently, the folded piece 14d of the rockable lever 14 is disengaged from the notch 19c in the short arm 19a of the operating lever 19, whereby the rockable lever 14 rotates counterclockwise about the pivot 15 under the action of the spring 17, returning to the original position shown in FIG. 2. At this time, the pin 14a on the rockable lever 14 pushes the arm 13 upward, causing the arm 13 to rotate counterclockwise together with the shaft 11. The support lever 12 (FIG. 3) also rotates in the same direction, whereby the pinch roller 4 is moved away from the feed roller 5, thus terminating a feed operation of the sheet 2. However, the leading end of the sheet 2 is already clamped by the retaining claw 6 so as to rotate with the drum 1, so that the sheet 2 continues to be fed.

Figure 5:
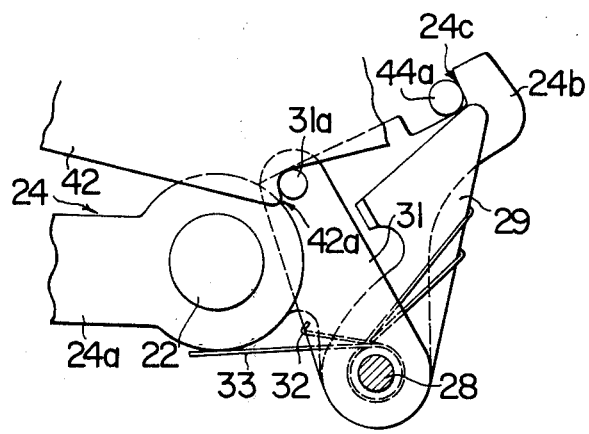

As mentioned previously, the retaining claw 6 is opened by a counterclockwise rotation of the control lever 24 about the stud 22 which occurs as a result of an engagement of the pin 44a on the operating plate 44 with the detent hook 24c, and the leading end of the sheet 2 is clamped by closing the retaining claw 6 subsequently. In order to prevent the retaining claw 6 from being opened again, the pin 44a must be unlocked from the control lever 24. This takes place in the following manner. FIG. 4 shows the position of related members before the pin 44a is caught by the detent hook 24c in the control lever 24. When the pin 44a is caught by the detent hook 24c as indicated in FIG. 5, the upper edge of the lever 29 bears against the pin 44a, whereby the lever 29 rotates clockwise about the shaft 28, and the lever 31 also rotates in the same direction about the shaft 28 under the action of the spring 32. As a consequence, the pin 31a on the lever 31 moves into the path of movement of the cam edge 42a of the control plate 42. As the control plate 42 rotates with the drum 1, the cam edge 42a engages the pin 31a to cause the arm 31 to rotate clockwise about the shaft 28, to change the arm 31 from an inclined position to an upright position while moving it downward. This results in an clockwise rotation of the control lever 24 about the stud 22. Simultaneously, the pin 44a is disengaged from the detent hook 24c and the cam disc 43 accompanies the shaft 1a of the drum as it rotates. Also the pin 31a is disengaged from the cam edge 42a. Both levers 29, 31 rotate counterclockwise about the shaft 28 under the action of the spring 33, returning to the position shown in FIG. 4. As the control lever 24 rotates clockwise about the stud 22 as mentioned above, it comes to be locked by the detent lever 26 again, as shown in FIG. 2, thus returning to its original position.

When the leading and trailing ends of the sheet are firmly clamped by the process mentioned above, a scanning takes place in a facsimile system, for example. Upon completion of such processing, the apparatus is now ready to deliver the sheet. A solenoid or electromagnet actuating signal is produced when the scanning operation has terminated, thus energizing the coil of the electromagnet 25 shown in FIG. 2. Thereupon the control lever 24 is unlocked from the detent member 26, opening the retaining claw 6 associated with the leading end of the sheet by the process mentioned above as the leading end assumes the position shown in FIG. 16, and also projecting the delivery claws 51 externally of the peripheral surface of the drum 1. In this manner, the leading end of the sheet 2 is unclamped while its trailing end is still clamped by the retaining plate 55. When the retaining claw 6 assumes the position C shown in FIG. 14 during further rotation of the drum 1, the claw 6 is closed. Slightly before a closing operation of the claw 6 takes place, the retaining member 7 which rotates together with the drum 1 is stopped by the stop member 59, whereby the trailing end of the sheet 2 is disengaged from the retaining plate 55, thus releasing it.

Figure 16:
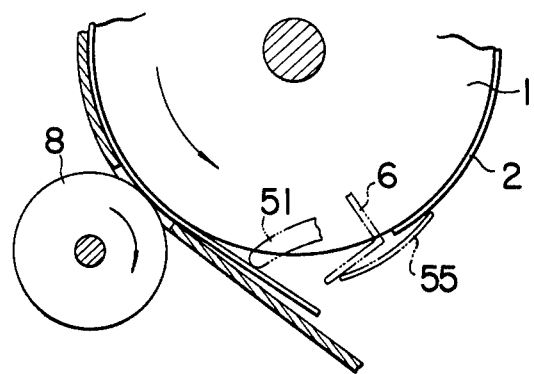
FIG. 16 is a fragmentary front view illustrating the leading end of the sheet as it is released.

When the retaining claw 6 associated with the leading end of the sheet is opened in the position shown in FIG. 16, the operating roller 48 projects externally of the peripheral surface of the drum 1 as shown in FIG. 9. Referring to FIG. 2, as the drum 1 rotates, the operating roller 48 in its projected position bears against the projection 36b (see FIG. 6) of the control rod 36, thus tipping it. As a consequence, the delivery roller support lever 34 is rotated clockwise about the shaft 35 under the action of the spring 39, whereby the delivery roller 8 moves into contact with the peripheral surface of the drum 1. In this manner, a feeding action is applied by the cooperation of the drum 1 and the delivery roller 8 to the sheet 2 which has its leading end freed from the retaining claw 6 as shown in FIG. 16. The trailing end of the sheet 2 then becomes disengaged from the retaining plate 55. The delivery roller 8 is maintained in contact with the drum 1 in the following manner. Specifically, as the control rod 36 is tipped in FIG. 2, the lever 37, which has its inclined edge 37b engaged with the projection 36a on the control rod 36, follows the tipping under the action of the spring 38 to rotate clockwise about the stud 22, whereby the projection 36a is locked by the detent notch 37a in the lever 37 (see FIG. 6). In this manner, the delivery roller 8 is maintained in contact with the peripheral surface of the drum 1. The clockwise rotation of the lever 37 causes the projection 37c formed at the end thereof to move into the path of movement of the control pin 42b on the control plate 42 (see FIG. 7).

Figure 6:
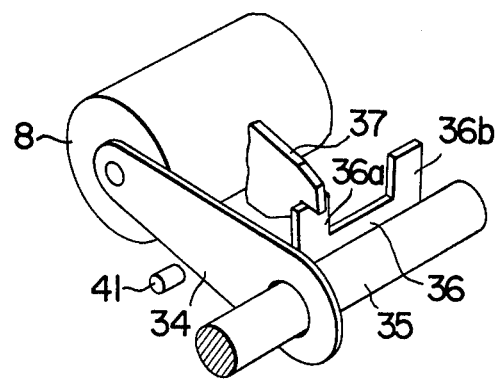
FIG. 6 is a perspective view of an operating assembly for a delivery roller.

Thus, the sheet 2 is delivered onto the delivery table 9 (see FIG. 1), whereupon the delivery roller 8 is moved away from the drum surface. Referring to FIG. 2, as the drum 1 rotates, the control pin 42b on the control plate 42 bears against the projection 37c on the arm 37 which has previously moved into the path of movement thereof, causing it to rotate counterclockwise. As a consequence, the control rod 36 which has been locked in the position shown in FIG. 6 is released, allowing the delivery roller support lever 34 to rotate counterclockwise about the shaft 35 until it abuts against the stop 41, thus moving the roller 8 away from the drum surface. After the control pin 42b has passed, the lever 37 is again locked in the position as shown in FIG. 2 by the control rod 36. Now the automatic sheet feed and delivery apparatus returns to the condition shown in FIG. 2 and is ready to receive and deliver another sheet.

Figure 17A:
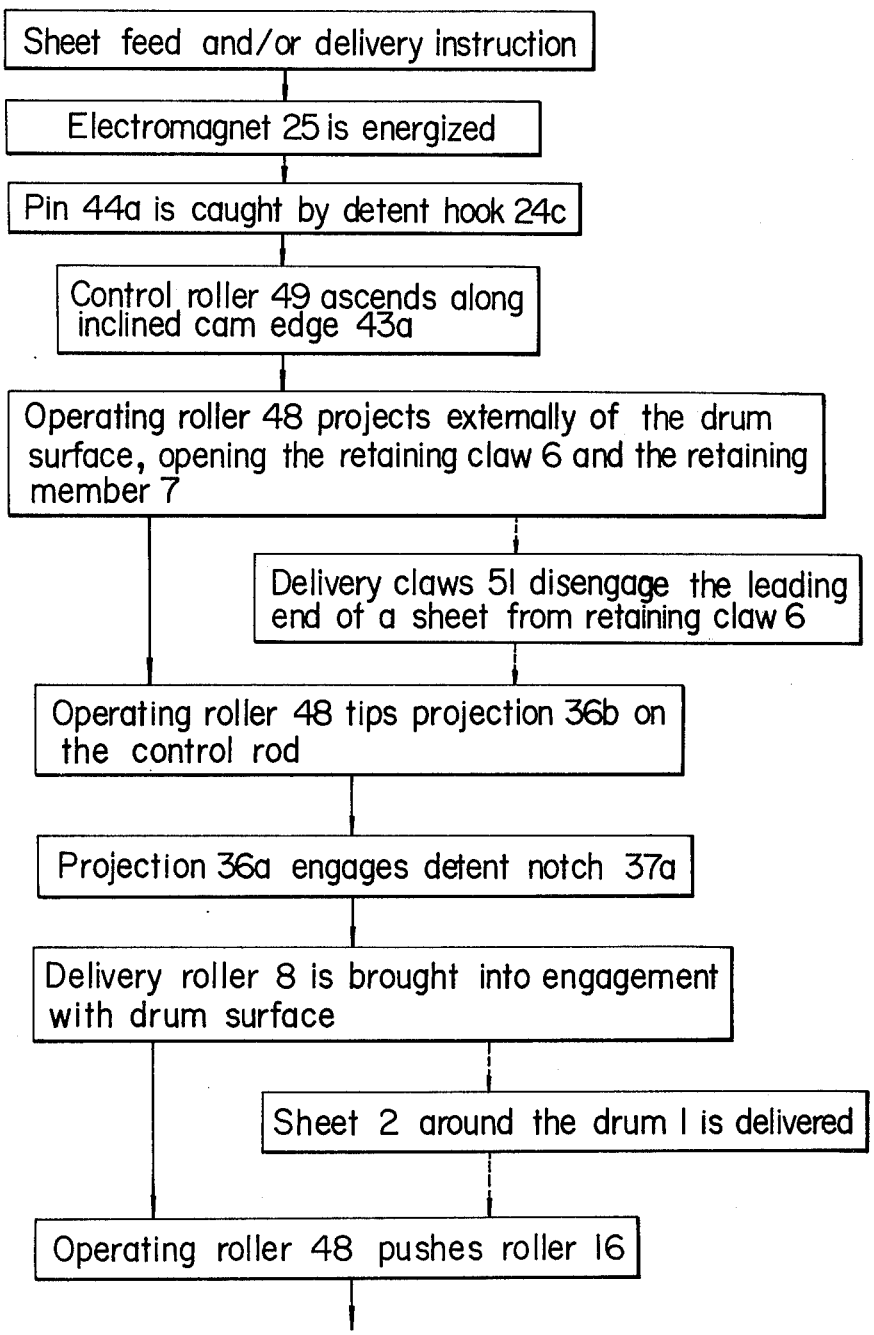
Figure 17C:
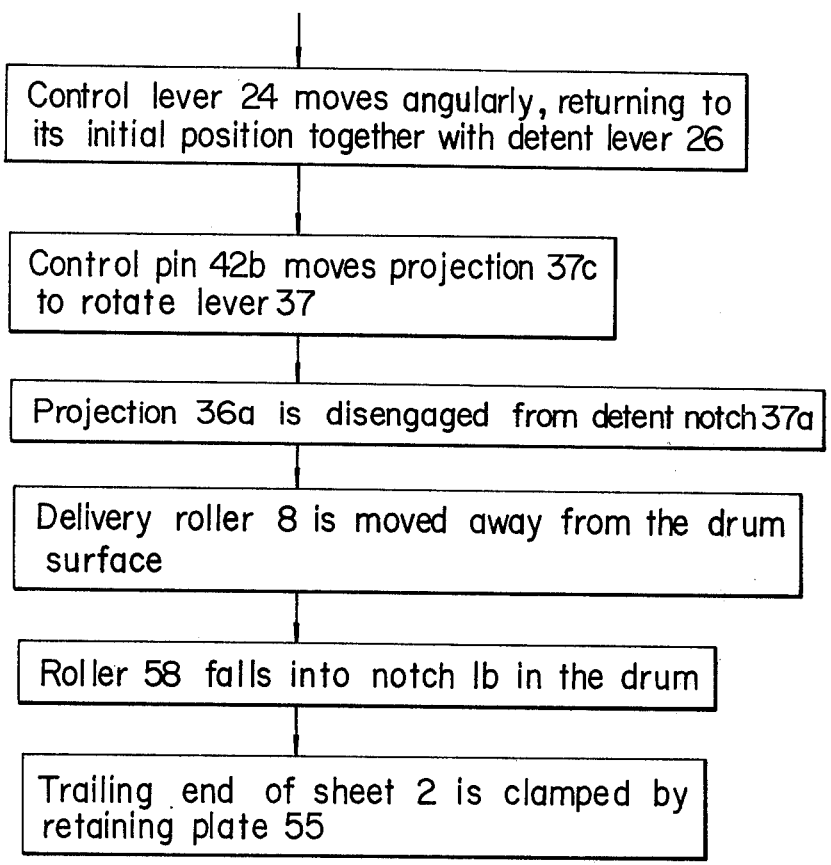

FIG. 17 shows a flow chart illustrating the operation of the described embodiment. In this Figure, arrows shown in thick lines represent operations which are common to both the sheet feed and delivery, while arrows in thin lines represent operations applicable to the sheet feed, and arrows in broken lines represent operations for sheet delivery.

In the apparatus of the invention, instead of manually placing a sheet 2 in the manner mentioned above, it is also possible to feed sheets one by one from a stack placed within the cassette, thereby providing a full automatic sheet feed and delivery apparatus. While in the embodiment described above, the electromagnet 25 has been actuated by the sheet detecting lever 61, it may be replaced by any conventional means capable of detecting the presence of a sheet which assumes the position ready to be wrapped around the drum. Thus it will be understood that the invention has provided an automatic sheet feed and delivery apparatus which permits both the leading and trailing ends of a sheet to be firmly clamped onto a drum which is in rotation, and which permits an accurate sheet feed and delivery operation at a proper timing.

What is claimed is:

1. An automatic sheet feed and delivery apparatus comprising:
   a rotatable drum;
   retaining claw means mounted on and rotatable with said drum for clamping the leading end of a sheet fed thereto to the surface of said drum;
   retaining member means for clamping the trailing end of a sheet onto the drum, said retaining member means being rotatable with and rotatable relative to the drum along the peripheral surface thereof;

means for feeding a sheet to the drum;

means for detecting the presence of a sheet fed by the feeding means and for producing a signal indicative thereof;

a control lever means for initiating operation of said retaining claw means and said retaining member means;

means, responsive to a signal from the detecting means when a sheet is to be wrapped around the drum and also responsive to a sheet delivery signal when the sheet is to be removed from the drum, for actuating said control lever means;

cam disc means frictionally coupled for rotation with the drum and responsive to the operation of the control lever means to be prevented from rotation thereby;

means rotatable with the drum relative to the cam disc means when the latter is stopped from rotation and operable by the cam disc means for opening and then closing the retaining claw means to clamp the leading end of a sheet to the drum;

means for operating the sheet feed means as the retaining claw means, when opened by said opening and closing means, rotates together with the drum to a given position to feed the leading end of a sheet thereto;

release means for interrupting the operation of the sheet feed means after the leading end of the sheet fed onto the drum by said sheet feed means is clamped by the retaining claw means;

detent means for preventing rotation of the retaining member means with the drum just before the leading end of the sheet is clamped by the retaining claw means and while the drum is rotating through one revolution after the leading end of the sheet is clamped by the retaining claw means;

means for releasing the retaining member means from the detent means when the trailing end of the sheet has moved to a position opposite to the retaining member means after said one revolution of the drum whereby the retaining member means clamps the trailing end of the sheet onto the surface of the drum and rotates therewith; and delivery means responsive to said control lever means after a sheet delivery signal for delivering the sheet from the drum.

2. An automatic sheet feed and delivery apparatus according to claim 1 in which the retaining member means comprises:

a retaining member extending in a direction parallel to the axis of the drum and across the peripheral surface thereof;

a pair of bands fitted arund the peripheral surface of the drum at the opposite ends thereof for supporting said retaining member and each having a partly open portion; and bias means disposed in said open portions for drawing said bands onto the drum ends such that the retaining members is biased to be pressed against the peripheral surface of the drum.

3. An automatic sheet feed and delivery apparatus according to claim 1 in which the sheet feed means comprises:

a feed roller normally rotating in a direction to feed a sheet toward the drum; and a pinch roller movable toward and away from the feed roller; and wherein said operating means comprises means for maintaining the pinch roller againt the feed roller; and wherein said release means comprises an operating lever means for releasing the maintaining means when the retaining claw means rotates with the drum beyond said given position.

4. An automatic sheet feed and delivery apparatus according to claim 1 in which the cam disc means includes a pin and the control lever means includes a detent hook means located adjacent the end face of the drum for catching the pin to prevent rotation of the cam disc means with the drum when the control lever means is operated by said actuating means.

5. An automatic sheet feed and delivery apparatus according to claim 1 in which said means for opening and closing the retaining claw means includes roller means for rolling on the cam disc means when the latter is prevented from rotation by the control lever means.

6. An automatic sheet feed and delivery apparatus according to claim 1 in which the retaining claw means comprises sheet delivery claws contained inside the drum when said retaining claw means is closed and projected externally of the drum surface when the retaining claw means is opened.

7. An automatic sheet feed and delivery apparatus according to claim 1 in which the retaining claw means comprises a support member means for moving the retaining member means in a direction away from the drum surface when the retaining claw means is opened.

8. An automatic sheet feed and delivery apparatus according to claim 7 in which the detent means includes a stop member means for engaging the retaining member means as it is urged in a direction away from the drum surface.

9. An automatic sheet feed and delivery apparatus according to claim 1 in which the retaining member means is disposed on the drum surface in overlying relationship with the retaining claw means.

10. An automatic sheet feed and delivery apparatus according to claim 1 in which the retaining member means comprises means for maintaining the sheet in abutment against the drum surface after the leading end of the sheet is clamped by the retaining claw means until the retaining member means is released from the detent means.

11. An automatic sheet feed and delivery apparatus according to claim 2 in which the releasing means comprises;

a roller mounted on one of said bands and pressed against the drum surface by the action of said bias means; and an opening in the drum surface for passing said roller into the drum.

12. An automatic sheet feed and delivery according to claim 3 in which the peripheral speed of the feed roller is greater than the peripheral speed of the drum.

13. An automatic sheet feed and delivery apparatus according to claim 4 further comprising means for disenaging said pin from said detent hook means and resetting said control lever means.

14. An automatic sheet feed and delivery apparatus according to claim 1 in which said delivery means comprises:

a pivotable roller means for pressing against the surface of the drum;

means for locking said roller means in pressing engagement with said drum surface; and
means for unlocking said locking means to permit the withdrawal of said roller means from pressing engagement with the drum surface.

15. An automatic sheet feed and delivery apparatus according to claim 14 further comprising means for actuating said release means and said unlocking means including a cam rotatable with said drum.

* * * * *